US006764588B2

(12) United States Patent
Smedley et al.

(10) Patent No.: US 6,764,588 B2
(45) Date of Patent: Jul. 20, 2004

(54) METHOD OF AND SYSTEM FOR FLUSHING ONE OR MORE CELLS IN A PARTICLE-BASED ELECTROCHEMICAL POWER SOURCE IN STANDBY MODE

(75) Inventors: Stuart I. Smedley, Escondido, CA (US); Donald James Novkov, Encinitas, CA (US); Kent I. Smedley, San Marcos, CA (US); Raymond H. Alstadt, Collierville, TN (US); Frederick R. Grochulski, El Cajon, CA (US)

(73) Assignee: Metallic Power, Inc., Carlsbad, CA (US)

( * ) Notice: Subject to any disclaimer, the term of this patent is extended or adjusted under 35 U.S.C. 154(b) by 125 days.

(21) Appl. No.: 10/150,655

(22) Filed: May 17, 2002

(65) Prior Publication Data

US 2003/0213690 A1 Nov. 20, 2003

(51) Int. Cl.[7] .............................. C25C 7/00; C25B 9/00; H01M 2/38; H01M 7/00
(52) U.S. Cl. ........................ 205/343; 205/348; 204/269; 204/263; 429/27; 429/51; 429/70; 429/80; 429/118
(58) Field of Search ........................... 205/343, 50, 64, 205/57, 348; 204/275.1, 263–266, 269; 429/27, 70, 51, 80, 118

(56) References Cited

U.S. PATENT DOCUMENTS

| | | | |
|---|---|---|---|
| 3,440,098 A | 4/1969 | Stachurski | 136/6 |
| 3,451,851 A | 6/1969 | Stanimirovitch | 136/30 |
| 3,639,173 A | 2/1972 | Stachurski | 136/3 |
| 3,660,170 A | 5/1972 | Rampel | 136/154 |
| 3,663,298 A | 5/1972 | McCoy et al. | 136/31 |
| 3,716,413 A | 2/1973 | Eisner | 136/86 |
| 3,767,466 A | 10/1973 | McCoy et al. | 136/131 |
| 3,811,952 A | 5/1974 | Siwersson et al. | 136/86 |
| 3,847,671 A | 11/1974 | Leparulo et al. | 136/86 |
| 3,879,225 A | 4/1975 | Backhurst et al. | 136/86 |
| 3,887,400 A | 6/1975 | Doniat et al. | 136/86 |
| 3,902,918 A | 9/1975 | Pompon | 136/86 |
| 3,930,882 A | 1/1976 | Ohsawa et al. | 136/30 |

(List continued on next page.)

FOREIGN PATENT DOCUMENTS

| | | |
|---|---|---|
| EP | 0568822 A2 | 11/1993 |
| EP | 0755088 A2 | 1/1997 |
| FR | 2639767 | 11/1988 |
| FR | 2669775 | 11/1990 |
| JP | 51-494439 | 4/1976 |
| WO | WO 00/38260 | 6/2000 |

OTHER PUBLICATIONS

Appleby, A. J. et al.: *The C.G.E. Circulating Zinc/Air Battery: A Practical Vehicle Power Source*; Journal of Power Sources; 1976/1977; vol. 1; pp. 17–24. (No month).

Appleby, A.J. et al.: *Charge–Discharge Behavior of the C.G.E. Circulating Zinc–Air Vehicle Battery*; Society of Automotive Engineers, Cobo Hall, Detroit; Feb. 28–Mar. 4, 1977.

(List continued on next page.)

*Primary Examiner*—Donald R. Valentine
(74) *Attorney, Agent, or Firm*—Howrey Simon Arnold & White, LLP

(57) ABSTRACT

A method of and system for flushing one or more cells or components thereof in a particle-based electrochemical power source is provided. Reaction solution is delivered to and withdrawn from the one or more cells when the electrochemical power source is in a standby mode of operation.

13 Claims, 10 Drawing Sheets

U.S. PATENT DOCUMENTS

| | | | | |
|---|---|---|---|---|
| 3,944,430 | A | 3/1976 | Lee | 136/30 |
| 3,970,472 | A | 7/1976 | Steffensen | 136/3 |
| 3,981,747 | A | 9/1976 | Doniat et al. | 429/15 |
| 3,985,581 | A | 10/1976 | Stachurski | 429/51 |
| 4,074,028 | A | 2/1978 | Will | 429/105 |
| 4,105,829 | A | 8/1978 | Venero | 429/15 |
| 4,127,701 | A | 11/1978 | Symons et al. | 429/19 |
| 4,145,482 | A | 3/1979 | von Benda | 429/27 |
| 4,147,839 | A | 4/1979 | Solomon et al. | 429/15 |
| 4,172,924 | A | 10/1979 | Warszawski | 429/15 |
| 4,182,383 | A | 1/1980 | Adomitis et al. | 141/5 |
| 4,198,475 | A | 4/1980 | Zaromb | 429/15 |
| 4,218,521 | A | 8/1980 | Putt et al. | 429/39 |
| 4,272,333 | A | 6/1981 | Scott et al. | 204/23 |
| 4,287,273 | A | 9/1981 | Harney et al. | 429/153 |
| 4,352,864 | A | 10/1982 | Struthers | 429/18 |
| 4,415,636 | A | 11/1983 | Charkey | 429/27 |
| 4,479,856 | A | 10/1984 | Ando | 204/55 |
| 4,485,154 | A | 11/1984 | Remick et al. | 429/14 |
| 4,521,497 | A * | 6/1985 | Tamminen | 429/27 |
| 4,563,403 | A | 1/1986 | Julian | 429/198 |
| 4,730,153 | A | 3/1988 | Breting et al. | 320/14 |
| 4,731,547 | A | 3/1988 | Alenduff et al. | 307/85 |
| 4,802,100 | A | 1/1989 | Aasen et al. | 364/494 |
| 4,828,939 | A | 5/1989 | Turley et al. | 429/38 |
| 4,842,963 | A | 6/1989 | Ross, Jr. | 429/21 |
| 4,855,030 | A | 8/1989 | Miller | 204/212 |
| 4,950,561 | A | 8/1990 | Niksa et al. | 429/27 |
| 5,006,424 | A | 4/1991 | Evans et al. | 429/15 |
| 5,156,925 | A | 10/1992 | Lapp | 429/19 |
| 5,188,911 | A | 2/1993 | Downing et al. | 429/70 |
| 5,196,275 | A | 3/1993 | Goldman et al. | 429/27 |
| 5,208,526 | A | 5/1993 | Goldman et al. | 320/2 |
| 5,260,144 | A | 11/1993 | O'Callaghan | 429/14 |
| 5,312,699 | A | 5/1994 | Yanagi et al. | 429/22 |
| 5,316,869 | A | 5/1994 | Perry, Jr. et al. | 429/19 |
| 5,318,861 | A | 6/1994 | Harats et al. | 429/21 |
| 5,346,778 | A | 9/1994 | Ewan et al. | 429/19 |
| 5,348,820 | A | 9/1994 | Suga et al. | 429/216 |
| 5,360,680 | A | 11/1994 | Goldman et al. | 429/27 |
| 5,366,829 | A | 11/1994 | Saidi | 429/216 |
| 5,369,353 | A | 11/1994 | Erdman | 323/207 |
| 5,378,329 | A | 1/1995 | Goldstein et al. | 204/115 |
| 5,382,482 | A | 1/1995 | Suga et al. | 429/206 |
| 5,401,589 | A | 3/1995 | Palmer et al. | 429/13 |
| 5,405,713 | A | 4/1995 | Pecherer et al. | 429/49 |
| 5,411,815 | A | 5/1995 | Goldstein | 429/50 |
| 5,427,872 | A | 6/1995 | Shen et al. | 429/142 |
| 5,432,710 | A | 7/1995 | Ishimaru et al. | 364/493 |
| 5,434,020 | A | 7/1995 | Cooper | 429/210 |
| 5,434,021 | A | 7/1995 | Fauteux et al. | 429/213 |
| 5,441,820 | A | 8/1995 | Siu et al. | 429/17 |
| 5,462,815 | A | 10/1995 | Horiuchi | 429/13 |
| 5,476,293 | A | 12/1995 | Yang | 290/4 |
| 5,500,561 | A | 3/1996 | Wilhelm | 307/64 |
| 5,547,778 | A | 8/1996 | Fauteux et al. | 429/81 |
| 5,558,947 | A * | 9/1996 | Robison | 429/13 |
| 5,563,802 | A | 10/1996 | Plahn et al. | 364/492 |
| 5,569,551 | A | 10/1996 | Pedicini et al. | 429/27 |
| 5,578,183 | A | 11/1996 | Cooper | 205/64 |
| 5,635,051 | A | 6/1997 | Salas-Morales et al. | 205/602 |
| 5,637,414 | A | 6/1997 | Inoue et al. | 429/13 |
| 5,780,186 | A | 7/1998 | Casey, Jr. | 429/229 |
| 5,783,932 | A | 7/1998 | Namba et al. | 322/16 |
| 5,795,666 | A | 8/1998 | Johnssen | 429/17 |
| 5,795,679 | A | 8/1998 | Kawakami et al. | 429/218 |
| 5,824,434 | A | 10/1998 | Kawakami et al. | 429/209 |
| 5,849,427 | A | 12/1998 | Siu et al. | 429/17 |
| 5,869,200 | A | 2/1999 | Nunnally | 429/10 |
| 5,880,536 | A | 3/1999 | Mardirossian | 307/44 |
| 5,885,727 | A | 3/1999 | Kawatsu | 429/17 |
| 5,929,538 | A | 7/1999 | O'Sullivan et al. | 307/66 |
| 5,952,117 | A | 9/1999 | Colborn et al. | 429/27 |
| 5,958,210 | A | 9/1999 | Siu et al. | 205/602 |
| 5,961,928 | A | 10/1999 | Maston et al. | 422/110 |
| 5,969,435 | A | 10/1999 | Wilhelm | 307/64 |
| 5,984,986 | A | 11/1999 | Wiesheu et al. | 48/203 |
| 5,985,474 | A | 11/1999 | Chen et al. | 429/17 |
| 5,999,888 | A | 12/1999 | Aubee | 702/45 |
| 6,051,192 | A | 4/2000 | Maston et al. | 422/110 |
| 6,067,482 | A | 5/2000 | Shapiro | 700/286 |
| 6,153,329 | A | 11/2000 | Raschilla et al. | 429/65 |
| 6,153,555 | A | 11/2000 | Narula et al. | 502/303 |
| 6,162,555 | A | 12/2000 | Gutierrez et al. | 429/15 |
| 6,186,254 | B1 | 2/2001 | Mufford et al. | 180/65.3 |
| 6,230,496 | B1 | 5/2001 | Hofmann et al. | 60/706 |
| 6,242,873 | B1 | 6/2001 | Drodz et al. | 318/139 |
| 6,296,958 | B1 | 10/2001 | Pinto et al. | 429/15 |
| 6,321,145 | B1 | 11/2001 | Rajashekara | 701/22 |
| 6,326,763 | B1 | 12/2001 | King et al. | 320/101 |

OTHER PUBLICATIONS

Cooper, J., et al.; *Demonstration of a Zinc/Air Fuel Battery to Enhance the Range and Mission of Fleet Electric Vehicles: Preliminary Results in the Refueling of a Multicell Module*; 29$^{th}$ Intersociety Energy Conversion Engineering Conference; Aug. 8, 1994; 8 pages.

Cooper, J.; *How the Zinc/Air Battery is Refueling the Competitiveness of Electric Vehicles*; Science & Technology Review; Oct. 1995; pp. 7–13.

* cited by examiner

METHOD OF AND SYSTEM FOR FLUSHING ONE OR MORE CELLS IN A PARTICLE-BASED ELECTROCHEMICAL POWER SOURCE IN STANDBY MODE

RELATED APPLICATION(S)

This application is related to U.S. patent application Ser. No. 10/060,965, entitled "RECIRCULATING ANODE", filed Oct. 19, 2001, and owned in common by the assignee hereof. U.S. Ser. No. 10/060,965 if hereby fully incorporated by reference herein as though set forth in full.

FIELD OF THE INVENTION

This invention relates generally to the field of particle-based electrochemical power sources, and, more specifically, to techniques for flushing the cells thereof

RELATED ART

Particle-based electrochemical power sources, including without limitation metal-based fuel cells, are emerging as an attractive alternative to traditional energy sources. In metal-based fuel cells, when metal anodes within the cell cavities are exposed to an electrolysis agent such as hydroxide, an electrochemical reaction takes place whereby the metal releases electrons, and a reaction product is formed, typically one or more ions or oxides of the metal. Through this process, the metal anodes are gradually consumed. The released electrons flow through a load to a cathode, where they react with a second reactant such as oxygen.

Particle-based electrochemical power sources, including without limitation metal-based fuel cells, which employ particulate anodes and which deliver reaction agents such as hydroxides to the anodes through a reaction solution pose particular challenges since, for such power sources (e.g., fuel cells) to function efficiently, it is appropriate to re-circulate the reaction solution throughout and within the particulate anodes so that the appropriate electrochemical reaction can take place. However, this recirculation and electrochemical reaction can have undesired consequences.

SUMMARY

These unintended consequences include certain problems of particle buildup, reduction in reaction solution flow through anode bed (e.g., clogging), and precipitation of solid zinc oxide that can occur during either the discharge cycle mode of operation due to the electrochemical reaction or the standby mode of operation due to the corrosion reaction described above.

For example, as the electroactive (e.g., metal) particles in the anode beds are consumed during the electrochemical reaction, they become smaller and smaller, and can become more densely packed together. The dense packing of the small particles can lead to particle buildup, clogging and interference with, and resulting reduction of, the flow of reaction solution throughout and within the particulate anodes. This in turn can lead to the generation of insoluble reaction products, which can further reduce the flow of reaction solution throughout the cell and/or the reaction bed. The result is typically a substantially less efficient fuel cell.

In a zinc-based fuel cell, for example, clogging caused by the generation of small particles can lead to the following electrochemical reaction occurring at the anode beds:

$$Zn + 2OH^- \rightarrow Zn(OH)_{2(s)} + 2e^- \quad (1)$$

The reaction product $Zn(OH)_{2(s)}$, unlike $Zn(OH)_4^{2-}$, is insoluble.

A related problem is that, as electrochemical dissolution occurs, the concentration of reaction products can increase. For example, during electrochemical dissolution in a zinc-air fuel cell, zincate, $Zn(OH)_4^{2-}$, in the KOH reaction solution increases. When the zincate saturation point is reached, any further electrochemical dissolution that occurs will cause zinc oxide, ZnO, to precipitate out of the KOH solution. Again, the generation of insoluble reaction products such as ZnO can further reduce the flow of reaction solution throughout the cell.

Even when the fuel cell is in a standby mode, and is not undergoing electrochemical dissolution, these problems can occur through a corrosion reaction that occurs. In the zinc fuel cell, for example, the corrosion reaction, in which zinc reacts with water, can be expressed as follows:

$$Zn + 2H_2O + 2OH^- \rightarrow Zn(OH)_4^{2-} + H_2 \quad (2)$$

As can be seen, zincate is the by-product of this reaction. Consequently, as this reaction occurs, zincate will build up, and when the zincate saturation level is reached, solid zinc oxide can precipitate out and clog the anode beds as described above. Moreover, because zinc is consumed in this reaction, this reaction will also result in smaller zinc particles, which can also lead to clogging of the anode beds as described above.

To solve these and other problems, the invention provides a method of and system for flushing one or more cells or components thereof in a particle-based electrochemical power source. According to this method and system, reaction solution is delivered to and withdrawn from the one or more cells when the electrochemical power source is in a standby mode of operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Introduction to Particle-Based Electrochemical Power Sources

An advantage of particle-based electrochemical power sources relative to traditional power sources such as lead acid batteries is that they can be refueled, and therefore are capable of providing energy over a longer duration of time than lead acid batteries. In a zinc-based fuel cell, for example, a fuel in the form of zinc or zinc-coated particles in a potassium hydroxide solution can be maintained in storage, and a discharged fuel cell can be replenished simply by removing the spent potassium hydroxide and zincate reaction product, and providing the fresh zinc particles in potassium hydroxide solution into the cell cavities. The zinc particles then form particulate beds within the cell cavities which function as the anodes.

Another advantage of these particle-based power sources is that they are regenerative, meaning that the reaction products and spent reaction solution thereof can be processed to form metal which can be reintroduced back into the fuel cells to replenish the anode beds as they are consumed by the electrochemical reaction. In the case of the zinc-based fuel cell, for example, the spent reaction solution may consist of zincate dissolved in potassium hydroxide. If the zincate is allowed to precipitate into zinc oxide, the spent reaction solution consists of zincate, zinc oxide, and potassium hydroxide and possibly zinc hydroxide. This spent reaction solution can be reprocessed back into zinc particles and fresh potassium hydroxide which can be reintroduced into the cell cavities during a next refueling cycle.

Particle-based electrochemical power sources other than metal-based fuel cells (e.g., zinc-based fuel cells) are suitable to enjoy the advantages of and to be practiced in accordance with the invention. These particle-based electrochemical power sources can be characterized in that they utilize electroactive particles other than metal or metal-coated particles to form the anode of the power source. Examples of non metallic particulate power sources are particles of sodium borohydride, sodium thiosulfate, oxalic acid, phosphorus, and manganese hydroxide.

Figure 1:
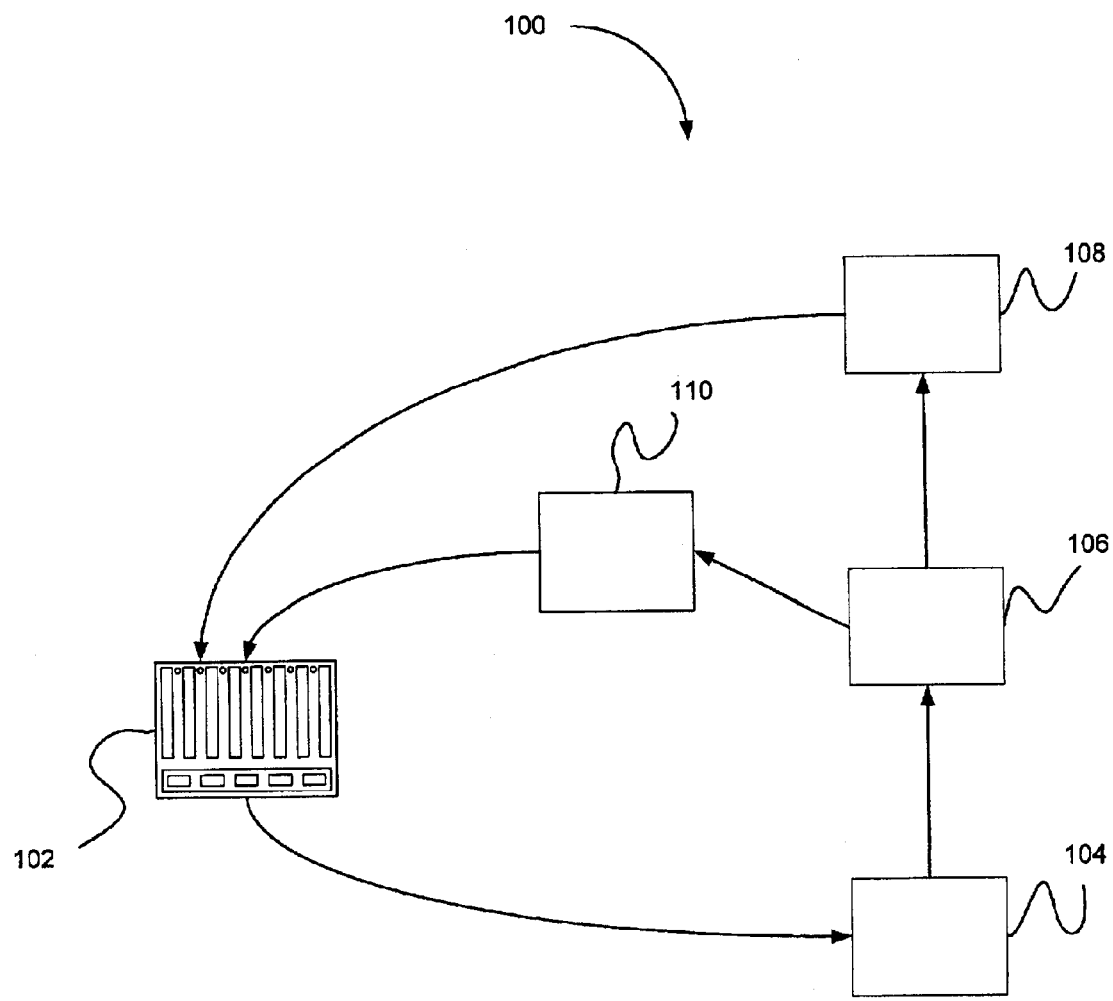
FIG. 1 is a block diagram of an embodiment of an electrochemical power system.
Figure 7:
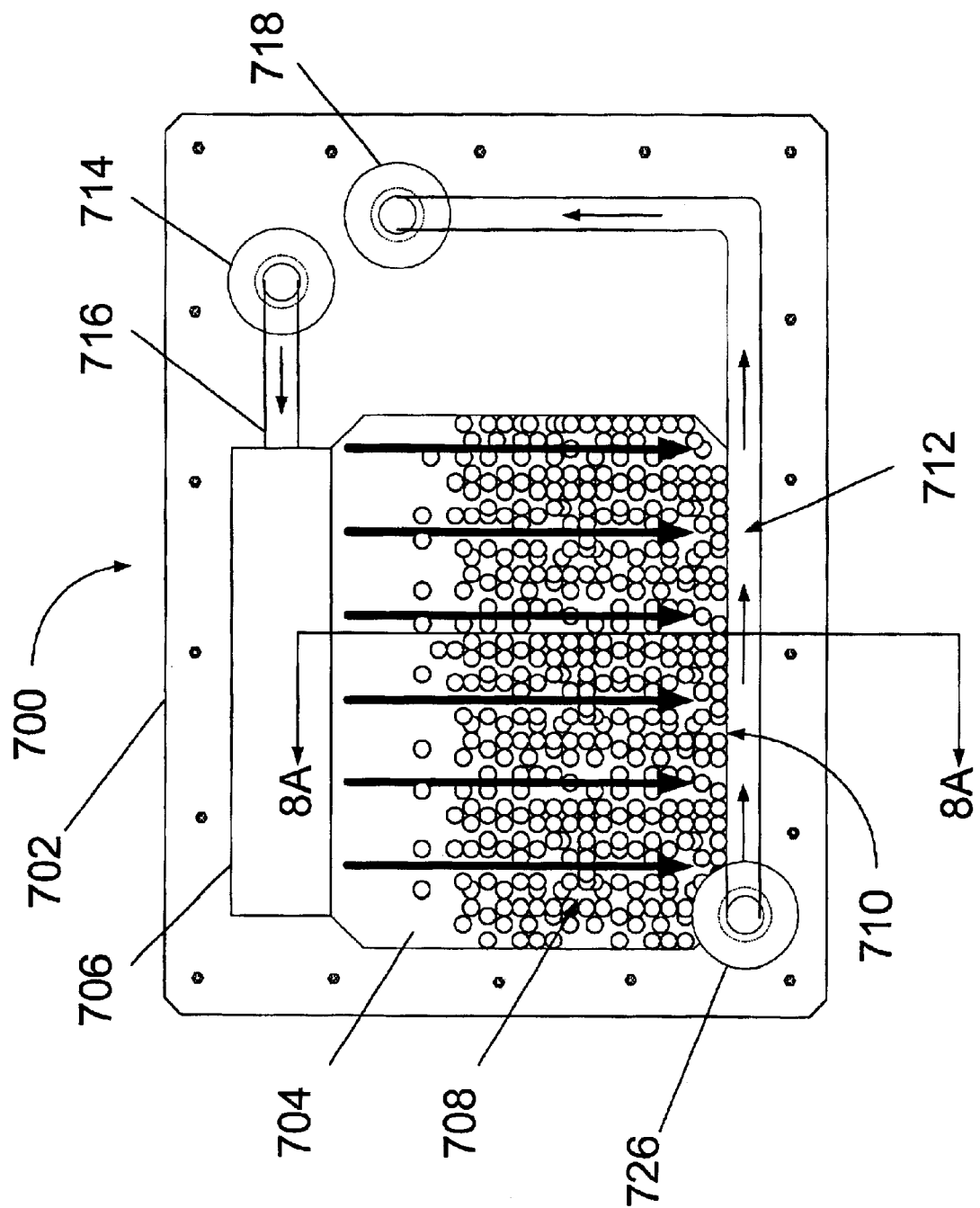
FIG. 7 is a front view of one example of an individual cell in a metal-based electrochemical power source.
Figure 9:
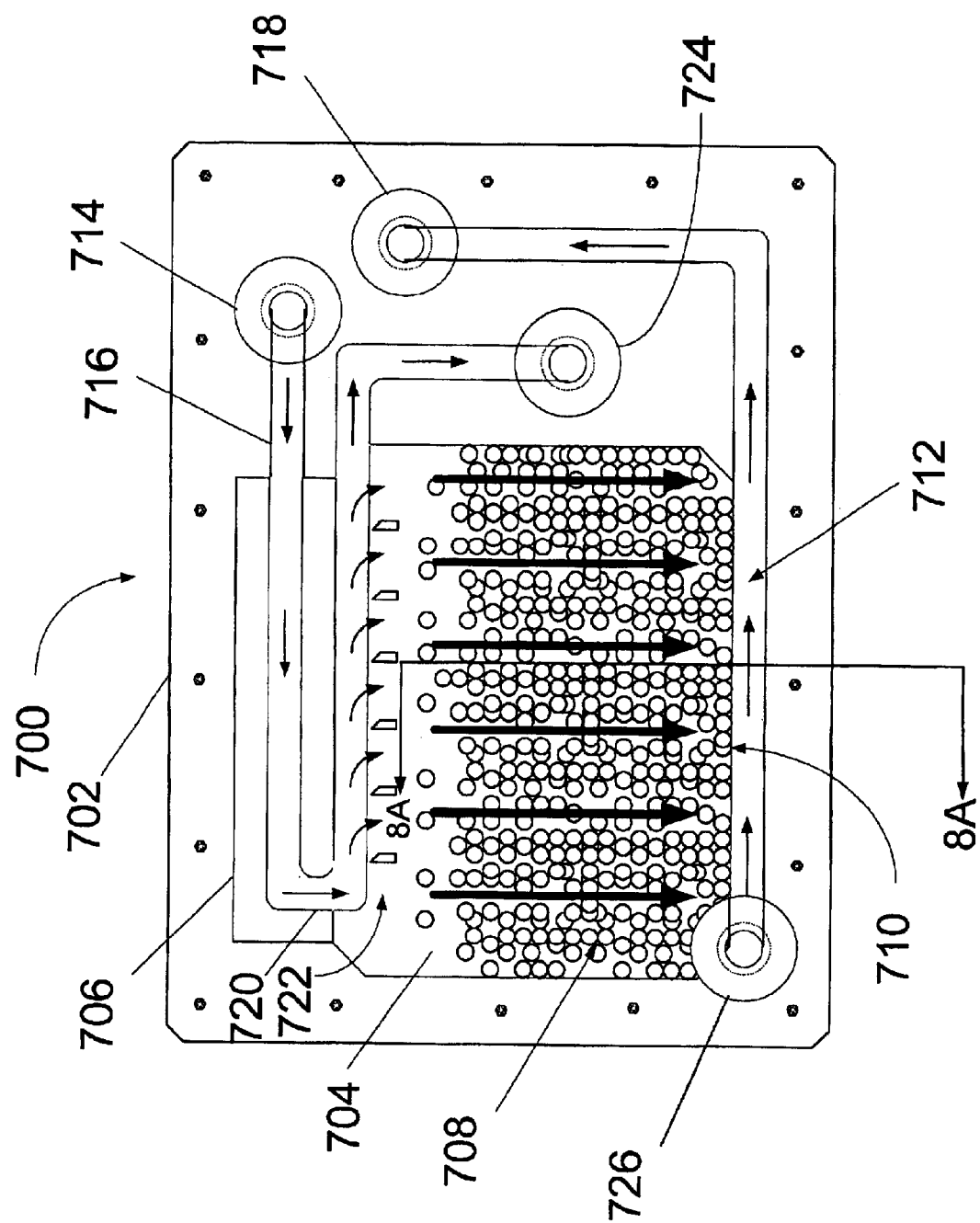
FIG. 9 is a front view of a second example of an individual cell employing one or more fluid mechanical devices in a metal-based electrochemical power source.

A block diagram of an embodiment 100 of a particle-based electrochemical power source is illustrated in FIG. 1. As illustrated, the particle-based electrochemical power source comprises a power source 102, an optional reaction product storage unit 104, an optional regeneration unit 106, a fuel storage unit 108, and an optional second reactant storage unit 110. The power source 102 in turn comprises one or more cells each having a cell body defining a cell cavity, with an anode and cathode situated in each cell cavity, as well as additional components of the cell (e.g., multiphase fluid flow conduits, and the like) that can comprise a stack of the cells. Exemplary cells are illustrated in FIGS. 7 and 9. The cells may be coupled in parallel or series. In one implementation, they are coupled in series to form a cell stack.

The anode flowing through the cell cavities comprises the fuel (e.g., electroactive particles) stored in fuel storage unit 108. In accordance with the invention, one suitable flow of anodes (i.e., electroactive particles (e.g., metal or metal-coated particles, and the like, including without limitation zinc and zinc-coated particles)) through the cell cavities of a particle-based electrochemical power source (e.g., metal-based fuel cells, and the like, including without limitation zinc-based fuel cells) comprises a static or quasi-static flow. As employed herein, "quasi-static flow" refers to a flow rate of the electroactive particles through the cell cavity that is significantly less than the flow rate of the electrolyte fluid carrier for such electroactive particles (as measured by its superficial velocity) through the cell cavity, and "static flow" refers to a flow rate of such electroactive particles that is not greater than about zero (and can be negative). In one implementation, the flow rate of electroactive particles through the cell cavity, measured as 0.3 cm$^3$/s, is not faster than one tenth of the flow rate of the electrolyte fluid, as measured by its superficial velocity through the cell cavity. The superficial velocity can be calculated, among other ways, by dividing the flow rate of the electrolyte fluid by the cross-sectional area of the cell cavity(ies) (assuming no particles are present) through which the electrolyte fluid passes.

In order to facilitate efficient function of, and/or to limit substantially nonuniform accumulation of reaction products within the cell cavity(ies) of, a particle-based electrochemical power source utilizing a flowing anode bed, it can be desirable to maintain a predetermined porosity through the flowing anode bed. In one aspect, this can be suitable where the particles of the flowing anode bed are not fully (i.e. 100%) consumed by dissolution or disintegration (e.g., via premature clogging/packing of the particles that can limit dissolution and/or disintegration) in the electrolyte reaction solution (e.g., KOH solution). Suitable predetermined porosities include without limitation porosities, $\epsilon$, greater than about 0.4, or greater than about 0.2, or greater than about 0, or in the range(s) from about 0.4 to about 0.8, where $\epsilon$ is the volume of the cell cavity not occupied by the electroactive particles divided by the total volume of the cell cavity. This measure of porosity, $\epsilon$, can be calculated, among other ways, by utilizing the equation $\epsilon=(1-$electroactive particle packing density), where the electroactive particles packing density is calculated by dividing the dry weight of the electroactive particles in each appropriate section (e.g., cell cavity) by the weight of a volume of pure electroactive particles equal to the volume of that section. As can be readily determined, the smaller the size of the electroactive particles, the greater the electroactive particles packing density, and the less the porosity. Suitable porosities can be achieved, among other ways, by configuring the cell cavity with one or more particle releaser(s) to permit relatively small electroactive particles to exit the cell. Suitable particle releasers can be in suitable regular and irregular geometric shapes, and include without limitation structures that permit particles that are likely to cause clogging of the cell cavity to exit the cell (e.g., lips, or segmented lips, on the cell wall, sieves, mesh, and the like, and suitable combinations of any two or more thereof); structures that reduce the gap at the exit of the cell to a dimension in the range(s) from about 100% to about 150% of the average longest dimension of an electroactive particle (e.g., diameter for a spherical particle); structures that jut out from the wall of the cell at the exit of the cell by a dimension in the range(s) from about 150% to about 200% of the average longest dimension of an electroactive particle (e.g., diameter for a spherical particle); and the like; and suitable combinations of any two or more thereof.

Within the cell cavities of power source 102, an electrochemical reaction takes place whereby the flowing anode bed releases electrons, and forms one or more reaction products. The electrons released from the electrochemical reaction at the anode flow through a load to the cathode, where they react with one or more second reactants from optional second reactant storage unit 110 or from some other source. This flow of electrons through the load gives rise to an overpotential (i.e., work) required to drive the demanded current, which overpotential acts to decrease the theoretical voltage between the anode and the cathode. This theoretical voltage arises due to the difference in electrochemical potential between the anode (Zn potential of $-1.215V$ versus standard hydrogen electrode (SHE) reference at open circuit) and cathode ($O_2$ potential of $+0.401V$ versus SHE reference at open circuit). When the cells are combined in series, the sum of the voltages for the cells forms the output voltage of the power source.

The one or more reaction products can then be provided to optional reaction product storage unit 104 or to some other destination. The one or more reaction products, from unit 104 or some other source, may then be provided to optional regeneration unit 106, which regenerates fuel and/or one or more of the second reactants from the one or more reaction products. The regenerated fuel can then be provided to fuel storage unit 108, and/or the one or more second reactants can then be provided to optional second reactant storage unit 110 or to some other destination. As an alternative to regenerating the fuel from the reaction product using the optional regeneration unit 106, the fuel can be inserted into the system from an external source and the reaction product can be withdrawn from the system.

The optional reaction product storage unit 104 comprises a unit that can store the reaction product. Exemplary reaction product storage units include without limitation one or more tanks, one or more sponges, one or more containers, one or more vats, one or more barrels, one or more vessels, and the like, and suitable combinations of any two or more thereof. Optionally, the optional reaction product storage unit 104 is detachably attached to the system.

The optional regeneration unit 106 comprises a unit that can electrolyze the reaction product(s) back into fuel (e.g., electroactive particles, including without limitation metal particles and/or metal-coated particles, and the like) and/or second reactant (e.g., air, oxygen, hydrogen peroxide, other oxidizing agents, and the like, and suitable combinations of any two or more thereof). Exemplary regeneration units include without limitation water electrolyzers (which regenerate an exemplary second reactant (oxygen) by electrolyzing water), metal (e.g., zinc) electrolyzers (which regenerate a fuel (e.g., zinc) and a second reactant (e.g., oxygen) by electrolyzing a reaction product (e.g., zinc oxide (ZnO)), and the like, and suitable combinations thereof. Exemplary metal electrolyzers include without limitation fluidized bed electrolyzers, spouted bed electrolyzers, and the like, and suitable combinations of two or more thereof. The power source 102 can optionally function as the optional regeneration unit 106 by operating in reverse, thereby foregoing the need for a regeneration unit 106 separate from the power source 102. Optionally, the optional regeneration unit 106 is detachably attached to the system.

The fuel storage unit 108 comprises a unit that can store the fuel (e.g., for particle-based electrochemical power sources, such as metal fuel cells, metal (or metal-coated) particles or liquid born metal (or metal-coated) particles or suitable combinations thereof). Exemplary fuel storage units include without limitation one or more tanks (for example, without limitation, a plastic or other inert material tank for holding potassium hydroxide (KOH) and metal (e.g., zinc (Zn), other metals, and the like) particles, and the like), one or more sponges, one or more containers (e.g., a plastic container for holding dry metal (e.g., zinc (Zn), other metals, and the like) particles, and the like), one or more vats, one or more barrels, one or more vessels, and the like, and suitable combinations of any two or more thereof. Optionally, the fuel storage unit 108 is detachably attached to the system.

The optional second reactant storage unit 110 comprises a unit that can store the second reactant. Exemplary second reactant storage units include without limitation one or more tanks (for example, without limitation, a high-pressure tank for gaseous second reactant (e.g., oxygen gas), a cryogenic tank for liquid second reactant (e.g., liquid oxygen) which is a gas at operating temperature (e.g., room temperature), a tank for a second reactant which is a liquid or solid at operating temperature (e.g., room temperature), and the like), one or more sponges, one or more containers, one or more vats, one or more barrels, one or more vessels, and the like, and suitable combinations of any two or more thereof. Optionally, the optional second reactant storage unit 110 is detachably attached to the system.

In one embodiment, the particle-based electrochemical power source is a metal-based fuel cell. The fuel of a metal-based fuel cell is a metal that can be in a form to facilitate entry into the cell cavities of the power source 102. For example, the fuel can be in the form of metal (or metal-coated) particles or liquid born metal (or metal-coated) particles or suitable combinations thereof Exemplary metals for the metal (or metal-coated) particles include without limitation zinc, aluminum, lithium, magnesium, iron, sodium, and the like.

In this embodiment, when the fuel is optionally already present in the anode of the cell cavities in power source 102 prior to activating the fuel cell, the fuel cell is pre-charged, and can start-up significantly faster than when there is no fuel in the cell cavities and/or can run for a time in the range(s) from about 0.001 minutes to about 100 minutes without additional fuel being moved into the cell cavities. The amount of time which the fuel cell can run on a pre-charge of fuel within the cell cavities can vary with, among other factors, the pressurization of the fuel within the cell cavities, and alternative embodiments of this aspect of the invention permit such amount of time to be in the range(s) from about 1 second to about 100 minutes or more, and in the range(s) from about 30 seconds to about 100 minutes or more.

Moreover, the second reactant optionally can be present in the fuel cell and pre-pressurized to any pressure in the range(s) from about 0.01 psi gauge pressure to about 200 psi gauge pressure prior to an outage sense time after the controller sensing the power outage condition to facilitate the fuel cell's start-up in a timeframe significantly faster than when there is no second reactant present and no pre-pressurization in the fuel cell prior to the optional controller sensing the power outage condition. Optionally, the one or more second reactants are present in the power source 102 at a time prior to an outage sense time, which outage sense time is in the range(s) from about 10 microseconds to about 10 seconds after the controller has sensed demand of primary power from (for use of the power source as a primary power source), or outage of primary power external to the power source (for use of the power source as a backup/auxiliary power source), the one or more loads.

Moreover, in this embodiment, one optional aspect provides that the volumes of one or both of the fuel storage unit 108 and the optional second reactant storage unit 110 can be independently changed as required to independently vary the energy of the system from its power, in view of the requirements of the system. Suitable such volumes can be calculated by utilizing, among other factors, the energy density of the system, the energy requirements of the one or more loads of the system, and the time requirements for the one or more loads of the system. In one embodiment, these volumes can vary in the range(s) from about 0.001 liters to about 1,000,000 liters.

In one aspect of this embodiment, at least one of, and optionally all of, the metal fuel cell(s) is a zinc-based fuel cell in which the fuel is in the form of fluid borne zinc particles immersed in a potassium hydroxide (KOH) electrolytic reaction solution, and the anodes within the cell cavities are particulate anodes formed of the zinc particles. In this embodiment, the reaction products may be the zincate ion, $Zn(OH)_4^{2-}$, or zinc oxide, $ZnO$.

In this embodiment, the one or more second reactants can be an oxidant (for example, oxygen (taken alone, or in any organic or aqueous (e.g., water-containing) fluid (for example and without limitation, liquid or gas (e.g., air)), hydrogen peroxide, and the like, and suitable combinations of any two or more thereof). When the second reactant is oxygen, the oxygen can be provided from the ambient air (in which case the optional second reactant storage unit 108 can be excluded), or from the second reactant storage unit 108. Similarly, when the second reactant is oxygen in water, the water can be provided from the second reactant storage unit 108, or from some other source, e.g., tap water (in which case the optional second reactant storage unit 108 can be excluded). In order to replenish the cathode, to deliver second reactant(s) to the cathodic area, and to facilitate ion exchange between the anodes and cathodes, a flow of the second reactant(s) can be maintained through a portion of the cells. This flow optionally can be maintained through one or more pumps (not shown in FIG. 1), blowers or the like, or through some other means.

In this embodiment, the particulate anodes are gradually consumed through electrochemical dissolution. In order to replenish the anodes, to deliver KOH to the anodes, and to facilitate ion exchange between the anodes and cathodes, a recirculating flow of the zinc particles can be maintained through the cell cavities. This flow can be maintained through one or more pumps (not shown) applied to deliver fluid borne zinc particles from the fuel storage tank 108 to the cell cavities, or through some other means.

As the potassium hydroxide contacts the zinc anodes, the following reaction takes place at the anodes:

$$Zn + 4OH^- \rightarrow Zn(OH)_4^{2-} + 2e^- \qquad (3)$$

The two released electrons flow through a load to the cathode where the following reaction takes place:

$$\frac{1}{2}O_2 + 2e^- + H_2O \rightarrow 2OH^- \qquad (4)$$

The reaction product is the zincate ion, $Zn(OH)_4^{2-}$, which is soluble in the reaction solution KOH. The overall reaction which occurs in the cell cavities is the combination of the two reactions (3) and (4). This combined reaction can be expressed as follows:

$$Zn + 2OH^- + \frac{1}{2}O_2 + H_2O \rightarrow Zn(OH)_4^{2-} \qquad (5)$$

Alternatively, the zincate ion, $Zn(OH)_4^{2-}$, may be allowed to precipitate to zinc oxide, ZnO, a second reaction product, in accordance with the following reaction:

$$Zn(OH)_4^{2-} \rightarrow ZnO + H_2O + 2OH^- \qquad (6)$$

In this case, the overall reaction which occurs in the cell cavities is the combination of the three reactions (3), (4), and (6). This overall reaction can be expressed as follows:

$$Zn + \frac{1}{2}O_2 \rightarrow ZnO \qquad (7)$$

Under real world conditions, the reactions (5) or (7) yield a voltage potential of about 1.4V. For additional information on this embodiment of a zinc-based battery, the reader is referred to U.S. Pat. Nos. 5,952,117; 6,153,329; and 6,162,555, which are hereby incorporated by reference herein as though set forth in full.

The reaction product $Zn(OH)_4^{2-}$, and also possibly ZnO, can be provided to reaction product storage unit 104. Optional regeneration unit 106 can then reprocess these reaction products to yield oxygen, which can be released to the ambient air or stored in second reactant storage unit 110, and zinc particles, which can be provided to fuel storage unit 108. In addition, the optional regeneration unit 106 may yield water, which may be discharged through a drain or stored in second reactant storage unit 110. It may also regenerate hydroxide, $OH^-$, which may be discharged or combined with potassium to yield the potassium hydroxide reaction solution.

The regeneration of the zincate ion, $Zn(OH)_4^{2-}$, into zinc and one or more second reactants, may occur according to the following overall reaction:

$$Zn(OH)_4^{2-} \rightarrow Zn + 2OH^- + H_2O + \frac{1}{2}O_2 \qquad (8)$$

The regeneration of zinc oxide, ZnO, into zinc and one or more second reactants may occur according to the following overall reaction:

$$ZnO \rightarrow Zn + \frac{1}{2}O_2 \qquad (9)$$

It should be appreciated that embodiments of metal fuel cells other than zinc fuel cells or the particular form of zinc fuel cell described above are possible for use in a particle-based electrochemical power source according to the invention. For example, aluminum fuel cells, lithium fuel cells, magnesium fuel cells, sodium fuel cells, iron fuel cells, and the like are possible, as are metal fuel cells where the fuel is not in particulate form but in another form such as sheets or ribbons or strings or slabs or plates. Embodiments are also possible in which the fuel is not fluid borne or continuously recirculated through the cell cavities (e.g., porous plates of fuel, ribbons of fuel being cycled past a reaction zone, and the like). It is also possible to avoid an electrolytic reaction solution altogether or at least employ reaction solutions besides potassium hydroxide, for example, without limitation, sodium hydroxide, inorganic alkalis, alkali or alkaline earth metal hydroxides. See, for example, U.S. Pat. No. 5,958,210, the entire contents of which are incorporated herein by this reference. It is also possible to employ metal fuel cells that output AC power rather than DC power using an inverter, a voltage converter, and the like.

In another embodiment, the particle-based electrochemical power source is a particle-based electrochemical power source that has one, or any suitable combination of two or more, of the following properties: the power source optionally can be configured to not utilize or produce significant quantities of flammable fuel or product, respectively; the power source can provide backup power to one or more loads for an amount of time limited only by the amount of fuel present (e.g., in the range(s) from about 0.01 hours to about 10,000 hours or more, and in the range(s) from about 0.5 hours to about 650 hours, or more); the power source optionally can be configured to have an energy density in the range(s) from about 35 Watt-hours per kilogram of combined fuel and electrolyte added to about 400 Watt-hours per kilogram of combined fuel and electrolyte added; the power source optionally can further comprise an energy requirement and can be configured such that the combined volume of fuel and electrolyte added to the system is in the range(s) from about 0.0028 L per Watt-hour of the system's energy requirement to about 0.025 L per Watt-hour of the system's energy requirement, and this energy requirement can be calculated in view of, among other factors, the energy requirement(s) of one or more load(s) comprising a system including the power source (In one embodiment, the energy requirement of the system can be in the range(s) from 50 Watt-hours to about 500,000 Watt-hours, whereas in another embodiment, the energy requirement of the system can be in the range(s) from 5 Watt-hours to about 50,000,000 Watt-hours); the power source optionally can be configured to have a fuel storage unit that can store fuel at an internal pressure in the range(s) from about −5 pounds per square inch (psi) gauge pressure to about 200 psi gauge pressure. In one implementation, this particle-based electrochemical power source comprises a metal-based fuel cell that, in one embodiment, is a zinc-based fuel cell.

Figure 1A:
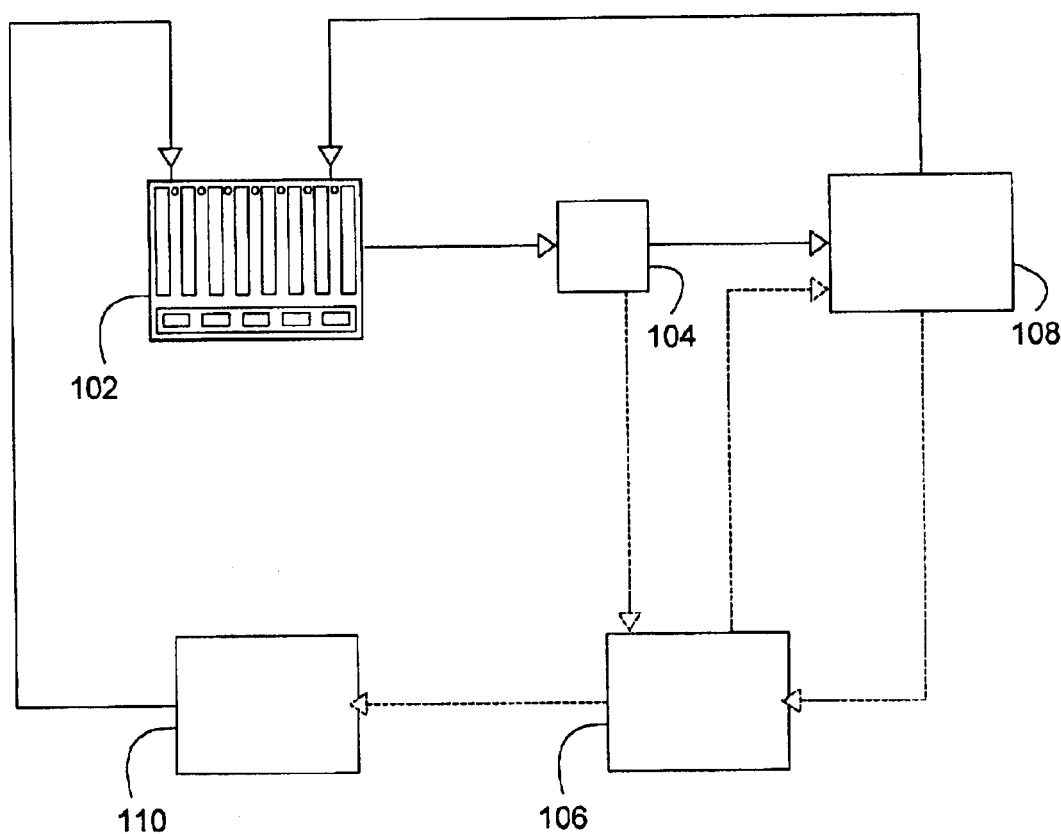
FIG. 1A is an alternative block diagram of an electrochemical power system.

FIG. 1A is a block diagram of an alternative embodiment of a metal-based fuel cell in which, compared to FIG. 1, like elements are referenced with like identifying numerals. Dashed lines are flow paths for the recirculating anode fluid when the optional regeneration unit is present and running. Solid lines are flow paths for the recirculating anode fluid when the fuel cell system is running in idle (standby) or discharge mode. As illustrated, in this embodiment, when the system is operating in the idle or discharge mode, optional regeneration unit 106 need not be in the flow path represented by the solid lines. Moreover, reaction product storage unit 104 may be combined with fuel storage unit 108 to form a single container or tank. Further, both particulate fuel and reaction solution may be contained within this container.

An advantage of particle-based electrochemical power sources relative to traditional power sources such as lead acid batteries is that they can provide longer term primary and/or auxiliary/backup power more efficiently and compactly. This advantage stems from the ability to continuously refuel the particle-based electrochemical power sources using fuel stored with the fuel cell, from some other source, and/or regenerated from reaction products by the optional regeneration unit 106. In the case of the zinc-based fuel cell, for example, the duration of time over which energy can be provided is limited only by the amount of fuel which is initially provided in the fuel storage unit 108, which is fed into the system during replacement of a fuel storage unit 108, and/or which can be regenerated by the optional regeneration unit 106 from the reaction products that are produced. Thus, a system, comprising at least one particle-based electrochemical power source that comprises an optional regeneration unit 106 and/or a replaceable and/or refillable fuel storage unit 108, can provide primary and/or auxiliary/backup power to the one or more loads for a time in the range(s) from about 0.01 hours to about 10000 hours, or even more. In one aspect of this embodiment, this system can provide back-up power to the one or more loads for a time in the range(s) from about 0.5 hours to about 650 hours, or even more. Moreover, such a system can optionally be configured to expel substantially no reaction product(s) outside of the system (e.g., into the environment).

DESCRIPTION OF PREFERRED EMBODIMENTS

Figure 2:
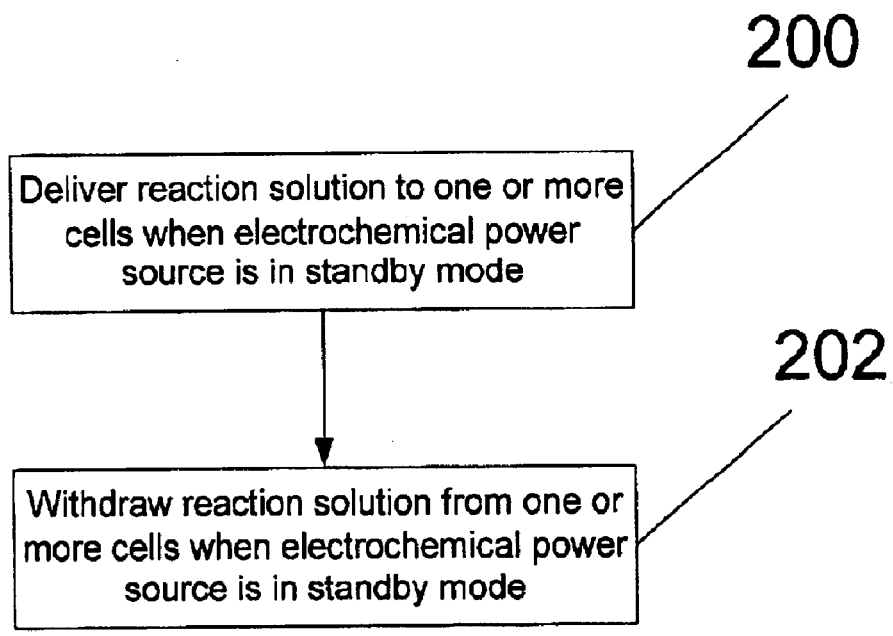
FIG. 2 is a simplified flowchart of one embodiment of a method according to the invention of flushing one or more cells in a particle-based electrochemical power source while the same is in standby mode.

Referring to FIG. 2, a flowchart of an embodiment of a method of flushing one or more cells or components thereof in a particle-based electrochemical power source is illustrated. In step 200, the method comprises delivering reaction solution to the one or more cells when the electrochemical power source is in a standby mode of operation.

In general, the standby mode of operation is to be contrasted with the discharge mode of operation, in which a desired electrochemical reaction is occurring with the one or more cells, and current is being drawn from the one or more cells through, e.g., application of a load to the power source. In the standby mode of operation, current is not drawn from the one or more cells and a load is not applied to the power source, although one or more undesired electrochemical reactions may occur within the one or more cells, e.g., corrosion or the like. In the standby mode, a regeneration unit, if one is present, may also be activated to regenerate fuel from reaction product produced during the discharge mode.

Step 200 is followed by step 202. In step 202, the method comprises withdrawing reaction solution from the one or more cells when the electrochemical power source is in a standby mode of operation.

The delivering step 200 may comprise pumping reaction solution to the one or more cells when the electrochemical power source is in a standby mode of operation. Also, the method may further comprise containing reaction solution in a container, and the delivering step 200 may comprise delivering reaction solution from the container to the one or more cells.

Furthermore, the withdrawing step 202 may comprise withdrawing reaction solution from the one or more cells and placing it in the container. The method may further comprise combining the reaction solution from the one or more cells with that in the container.

The method may also comprise ensuring that the reaction solution delivered to the one or more cells in the standby mode of operation is essentially free of fuel particles.

In one implementation example, in which the particulate fuel and reaction solution are both housed in the same container, this ensuring step is implemented by placing a rotatable sleeve valve engaged with a sleeve in a position which blocks particles of fuel from being introduced through one or more holes in the sleeve to the reaction solution delivered to the one or more cells.

Figure 4A:
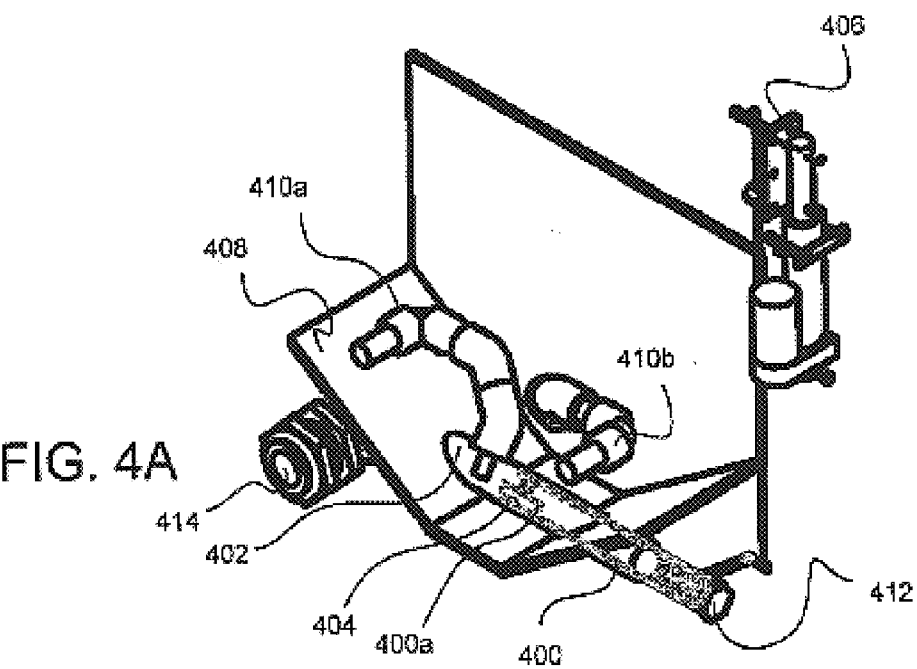
FIGS. 4A–4B illustrate an implementation example of a means for ensuring that reaction solution delivered to the one or more cells in the system of FIG. 3 or the method of FIG. 2 is essentially free of particulate fuel.
Figure 4B:
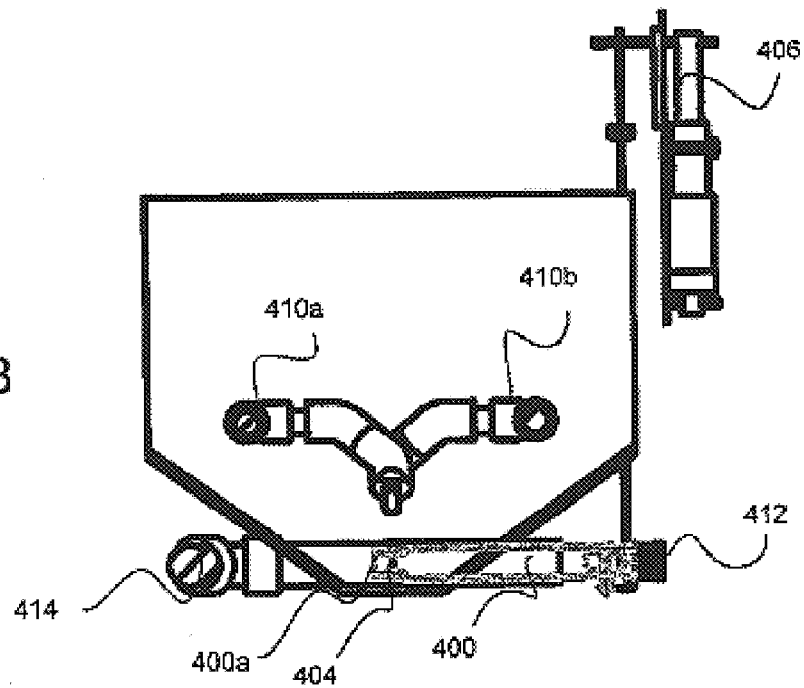

This implementation example may be explained with reference to FIGS. 4A and 4B. FIG. 4A is a plan view of the relevant portion of the container and FIG. 4B is a side view of the relevant portion of the container. Sleeve valve 400 engages sleeve 402. In a first position, illustrated in FIG. 4A, tab 400a of the sleeve valve blocks hole 404 in the side of the sleeve. (In one implementation example, hole 404 may be 4 mm in diameter). Consequently, any particulate fuel which may be resting on fuel hopper 408 and stirred up by stirrers 410a and 410b will be blocked from being introduced to the reaction solution which is being pumped through inlet 412 by a main pump (not shown) through outlet 414. This reaction solution is sucked into the sleeve 402 through inlet 412. Inlet 412 is located in an area of the container which is separated from particulate fuel through fuel hopper 408.

The position of the sleeve valve 400 is controlled by actuator 406. When the power source is in the standby mode, actuator 406 rotates the sleeve valve 400 to place it in the blocking position. Actuator 406 may also deactivate the stirrers 410a and 410b. Conversely, when the power source is in the discharge mode, actuator 406 may rotate the sleeve valve 400 to place it in a second non-blocking position in which tab 400a is not blocking the hole 404 in the sleeve 402. Actuator 406 may also activate stirrers 410a and 410b to stir up particulate fuel resting on the bottom of hopper 408 so that it may be introduced into the reaction solution being pumped to the cells through hole 404.

In a second implementation example, in which particulate fuel and reaction solution are again housed in the same container, the ensuring step may be implemented by moving a movable spout tube for spouting the reaction solution withdrawn from the one or more cells to a position which blocks particles of fuel from being spouted by the spout tube to one or more areas of the container from which reaction solution is delivered to the one or more cells.

This implementation example may be explained with reference to FIG. 5, which shows a side view of the container 518. As illustrated, spout tube is movable upwards and downwards under the control of actuator 516. In a first blocking position, the bottom 500a of the spout tube is flush with the top surface of support block 508. Reaction solution from the one or more cells is pumped through conduit 504 and into the spout tube. Any particulate fuel located at the bottom of the container is blocked from entering the spout tube.

Conduit 510 is fixed or movably fixed to the side of the container as shown. Reaction solution is pumped through inlet 514 from the container to the one or more cells by a main pump (not shown). Since the particulate fuel is blocked from entering the spout tube, the spout tube emits just the reaction solution withdrawn from the cells, and little or no particulate fuel is introduced to the area within the container in the vicinity of inlet 514. Accordingly, the reaction solution which is delivered to the cells when the spout tube is in the blocking position is essentially free of particulate fuel.

In contrast, during the discharge mode of operation, the spout tube 500 may be placed in the non-blocking position by actuator 516, whereby the bottom 500a of the spout tube is raised and exposed such that particulate fuel resting at the bottom of the container in the area 508 is allowed to enter the spout tube.

This particulate fuel is drawn into the spout tube along with reaction solution, and directed through the operation of the spout tube against baffle 506. Some of this particulate fuel is directed to the vicinity of the inlet 514 to conduit 510. This particulate fuel is introduced into the stream of reaction solution which is being delivered to the cells in the discharge mode of operation, and may be used to replenish the particulate anodes of the cells as they are consumed through electrochemical dissolution.

In this implementation example, when the power source is in the standby mode of operation, the actuator 516 may place the spout tube in the blocking position, thereby ensuring that the reaction solution which is delivered to the cells is essentially free of particulate fuel. Conversely, when the power source is in the discharge mode of operation, the actuator 516 may place the spout tube in the non-blocking position, thereby allowing particulate fuel to be introduced to the reaction solution which is being delivered to the cells.

In a third implementation example, again where the reaction solution and particulate fuel are housed in the same container, the ensuring step comprises maintaining a spout tube in a dormant state. This implementation example may be explained with reference to FIG. 6A, which illustrated container 600 for containing reaction solution 600a and particulate fuel 600b which is assumed to normally be resting on the bottom of the container 600 as shown.

A pump 604 may be active in both the standby and discharge modes of operation. The pump 604 draws reaction solution (and possibly particulate fuel) from container 600 through conduit 604a and delivers the same to the cells of fuel cell 602. At the same time, pump 604 forces reaction solution (and possibly small fuel particles prone to clogging, and solid and/or dissolved reaction product) through the cells of fuel cell 602 and delivers the same to container 600.

A stationary spout tube 606 is also provided within container 600. The bottom of the spout tube is placed flush against the top 608 of the support block 612. The spout tube 606 is coupled to pump 610, which, when activated, provides the motive force for the spout tube.

Figure 6A:
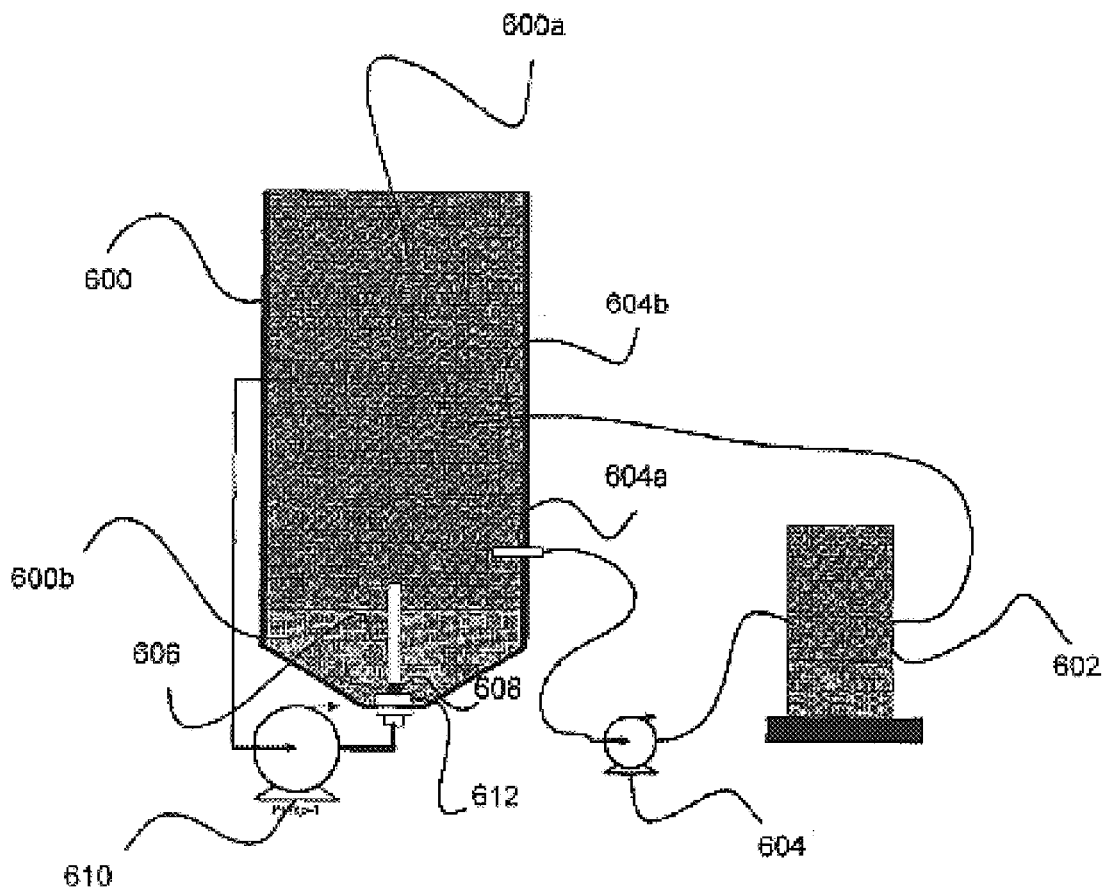
FIGS. 6A–6B illustrate a third implementation example of a means for ensuring that reaction solution delivered to the one or more cells in the system of FIG. 3 or the method of FIG. 2 is essentially free of particulate fuel.
Figure 6B:
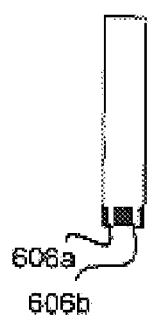

As illustrated in FIG. 6B, the bottom portion 612 of the spout tube is slotted with one or more slots 606a and 606b. When pump 610 is activated, particulate fuel 600b is drawn into the slots along with reaction solution and spouted by the spout tube. This action introduces at least some of the particulate fuel to the vicinity of the input conduit 604a for the reaction solution which is being pumped by pump 604 to the one or more cells of the fuel cell 602. This particulate fuel is drawn into the conduit along with reaction solution and introduced into the one or more cells.

When pump 610 is turned off, the spout tube 606 is dormant. Therefore, the reaction solution which is drawn into conduit 604a through the pumping action of pump 604 is essentially free of particulate fuel. Therefore, the reaction solution which is introduced to the one or more cells is essentially free of particulate fuel.

In this implementation, when the power source 602 is in the discharge mode, pump 610 is turned on. Consequently, particulate fuel will be introduced to the stream of reaction solution which is being introduced to the one or more cells of the power source. On the other hand, when the power source is in the standby mode of operation, pump 610 is turned off, thereby placing spout tube 606 in a dormant state. Consequently, in this mode of operation, the reaction solution which is delivered to the one or more cells is essentially free of particulate fuel.

Figure 5:
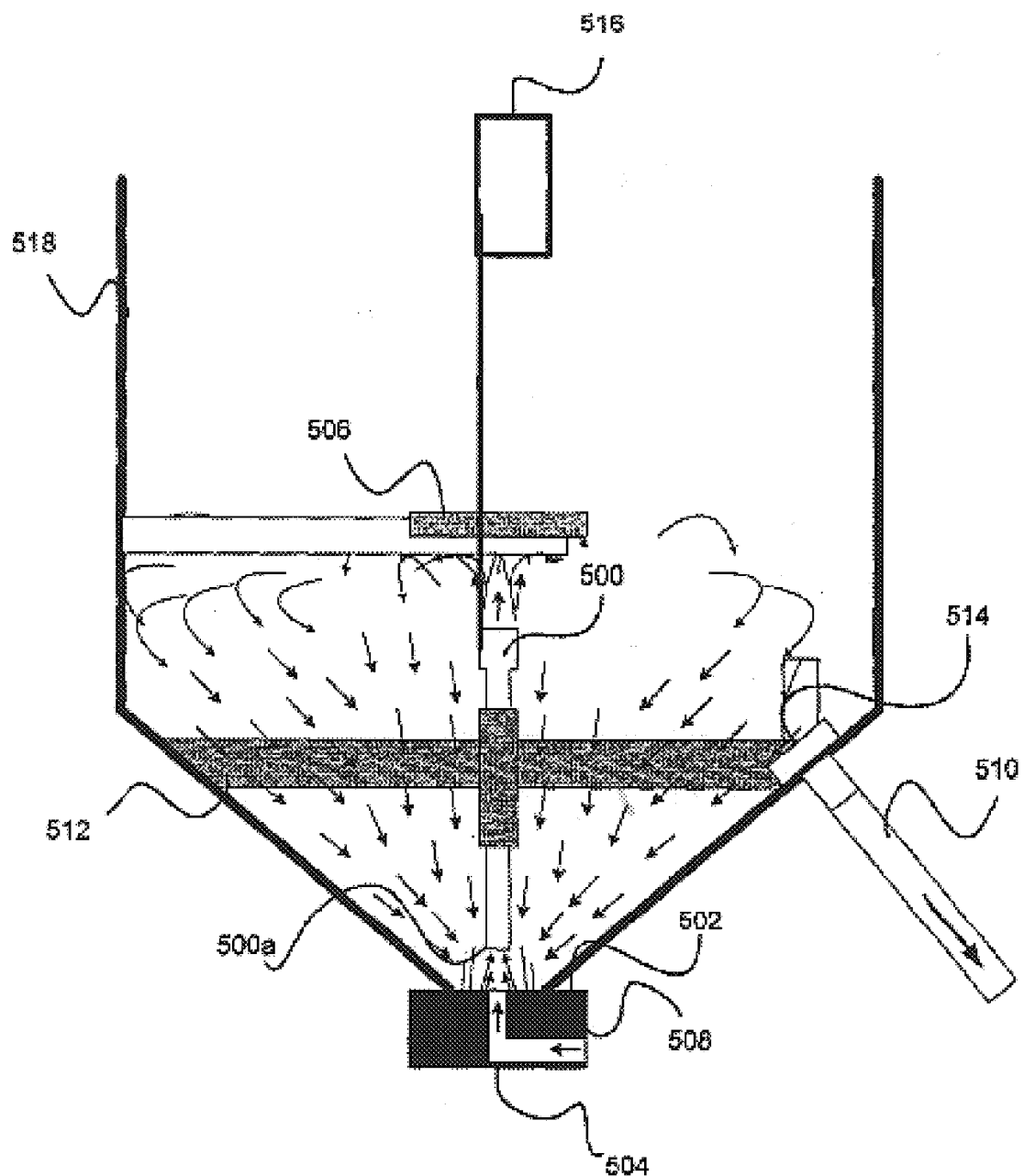
FIG. 5 illustrates a second implementation example of a means for ensuring that reaction solution delivered to the one or more cells in the system of FIG. 3 or the method of FIG. 2 is essentially free of particulate fuel.

In one alternative to this implementation example, in lieu of using a slotted spout tube as illustrate in FIG. 6B, a spout tube which is fixed in a raised position, as illustrated in FIG. 5, is possible. Another alternative, in lieu of turning pump 610 on and off in the discharge and standby modes, respectively, is to modulate the pump at different RPMs or frequencies in the two modes so that the particle fluidization, and hence particle delivery to the one or more cells, which occurs in the two modes differs. In one example, the pump is 610 is modulated to deliver fewer particles to the one or more cells in the standby mode.

Referring back to FIG. 2, the delivering and withdrawing steps may be performed periodically at a predetermined frequency, intermittently or pseudo-randomly. Alternatively or in addition, the delivering and withdrawing steps may be performed upon or after a defined event, such as at the end of a discharge cycle.

The delivering and withdrawing steps may also be used to flush the particulate anode(s) of the one or more cells and maintain their porosity. Moreover, the reaction solution from the one or more cells may carry from the one or more cells small fuel particles prone to clogging. Alternatively or in addition, the reaction solution from the one or more cells may carry dissolved reaction product from the one or more cells. Alternatively, or in addition, the reaction solution from the one or more cells carries solid reaction product precipitate from the one or more cells.

In one implementation example, the reaction solution from the one or more cells carries dissolved reaction product from the cell, the dissolved reaction product may be diluted when the reaction solution from the one or more cells is combined with that in a container.

In this example, the reaction solution delivered to the one or more cells may be taken from the container. Consequently, the reaction solution delivered to the one or more cells may have a diluted concentration of dissolved reaction product compared to the reaction solution withdrawn from the one or more cells.

As discussed previously, the reaction solution delivered to the one or more cells in the standby may be essentially free of fuel particles. On the other hand, it is possible for the reaction solution delivered to the one or more cells in the standby mode to bear fuel particles. It is even possible for the reaction solution delivered in the standby mode to bear the same quantity or density of particles as in the discharge mode.

Figure 3:
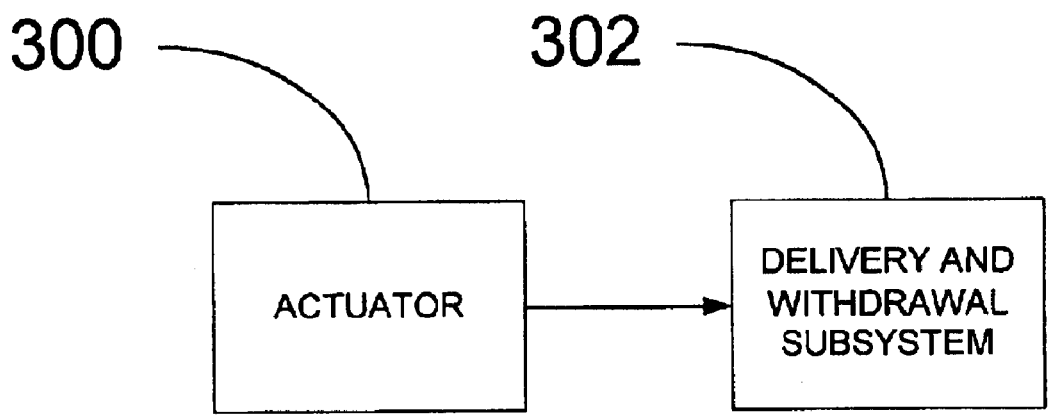
FIG. 3 is a simplified flowchart of one embodiment of a system according to the invention for flushing one or more cells in a particle-based electrochemical power source while the same is in a standby mode of operation.

Referring to FIG. 3, a system for flushing one or more cells or components thereof in a particle-based electrochemical power source is illustrated. As illustrated, the system comprises a delivery and withdrawal subsystem 302 for delivering reaction solution to the one or more cells and withdrawing reaction solution from the one or more cells. It also comprises an actuator 300 for actuating the delivery and withdrawal subsystem 302 when the electrochemical power source is in a standby mode of operation.

The delivery and withdrawal subsystem may comprise one or more pumps and related conduits. Moreover, the system may further comprise a container for containing reaction solution, and the delivery and withdrawal subsystem may deliver reaction solution from the container to the one or more cells. Furthermore, the delivery and withdrawal subsystem may withdraw reaction solution from the one or more cells and place it in the container. In addition, the reaction solution from the one or more cells may be combined with that in the container.

In one implementation, the system further comprises ensuring means for ensuring that the reaction solution delivered to the one or more cells during the standby mode of operation is essentially free of fuel particles.

In one implementation example, illustrated in FIGS. 4A and 4B, the ensuring means comprises a rotatable sleeve valve 400 engaging a sleeve 402 having a first position in which particles of fuel are blocked from being introduced through one or more holes 404 in the sleeve 402 to the reaction solution delivered to the one or more cells, and a second position in which particles of fuel situated in one or more areas of a container may be introduced through one or more holes 404 in the sleeve to the reaction solution delivered to the one or more cells; and a second actuator 406 for placing the rotatable sleeve valve 400 in the first position when the electrochemical power system is in the standby mode of operation. This implementation example was previously discussed in detail in relation to FIG. 2.

In a second implementation example, illustrated in FIG. 5, the ensuring means comprises a movable spout tube 500 for spouting the reaction solution withdrawn from the one or more cells, the spout tube 500 having a first position in which particles of fuel are blocked from being spouted by the spout tube to one or more areas of a container from which reaction solution is delivered to the one or more cells, and a second position in which particles of fuel may be spouted by the spout tube to the one or more areas of the container; and a second actuator 516 for placing the spout tube in the first position when the electrochemical power source is in the standby mode of operation. This implementation example as well was previously discussed in detail in relation to FIG. 2.

In a third implementation example, illustrated in FIG. 6A, the ensuring means comprises a spout tube 606, pump 610 and related conduits which, when actuated, are configured to spout particles of fuel to one or more areas of a container from which reaction solution is delivered to the one or more cells. When the electrochemical power source 602 is in the standby mode of operation, the pump 610 is either turned off or modulated at a different RPM or frequency as described previously. Again, this implementation example was previously discussed in detail in relation to FIG. 2.

Turning back to FIG. 3, the actuator 300 may be configured to actuate the delivery and withdrawal mechanism 302 periodically at a predetermined frequency, intermittently, or pseudo-randomly. Alternatively, or in addition, the actuator 300 may be configured to actuate the delivery and withdrawal mechanism 302 upon or after a defined event, such as at the end of a discharge cycle.

Furthermore, the reaction solution from the one or more cells may carry small fuel particles prone to clogging from the one or more cells. Alternatively or in addition, the reaction solution from the one or more cells may carry dissolved reaction product from the one or more cells. Alternatively or in addition, the reaction solution from the one or more cells may carry solid reaction product precipitate from the one or more cells.

As discussed previously, the reaction solution delivered to the one or more cells may be essentially free of fuel particles. Alternatively, the reaction solution delivered to the one or more cells may bear fuel particles. In one example, the delivered reaction solution bears the same quantity or density of fuel particles as in the discharge mode.

In the case in which the system comprises a container for containing reaction solution, and the reaction solution from the one or more cells bears dissolved reaction product, the dissolved reaction product may be diluted when the reaction solution from the one or more cells is combined with that in a container.

Moreover, the reaction solution delivered to the one or more cells may be taken from the container. Consequently, the reaction solution delivered to the one or more cells may have a diluted concentration of dissolved reaction product compared to the reaction solution withdrawn from the one or more cells.

EXAMPLE

FIG. 7 is a front view of an embodiment of an individual cell 700 within the power source 102 of a metal-based fuel cell. A particulate anode 708 is maintained within a cell cavity 704 of the cell. Within the cell cavity 704, when the cell is in standby mode, the particulate anode may undergo electrochemical dissolution (although at a much slower rate than the discharge mode) due to corrosion.

A first flow path for a recirculating flow of the reaction solution is provided through the anode. This flow path may be activated in the standby mode of operation. In the particular embodiment illustrated in FIG. 7, the first flow path extends from top to bottom through the anode, and is represented by the vertical arrows within cell cavity 704. When the power source is in the standby mode, reaction solution (usually essentially free of metal particles, although it is possible to include them) enters the cell at orifice 714, proceeds along conduit 716, and is distributed into the cell by flow distributor 706. From flow distributor 706, the flow path extends into and through the particulate anode 708, to the bottom 710 of the cell. From the bottom 710 of the cell, the flow path extends along conduit 712 and exits the cell at orifice 718.

Since this flow path extends through the particulate anode, it is useful for removing from the anode small particles of fuel prone to clogging, solid reaction product precipitate that may have formed in the anode, and reaction product dissolved in the reaction solution.

A second flow path for a recirculating flow of the reaction solution is also provided. This second flow path may also be activated in the standby mode of operation. In the particular embodiment illustrated in FIG. 7, the second flow path extends horizontally along the bottom of the cell from orifice 726, turns left, and terminates at orifice 718. When the power source is in the standby mode, reaction solution (usually essentially free of metal particles, although it is possible to include them) enters the cell at orifice 726, proceeds along conduit 712, and exits the cell at orifice 718.

Since this flow path extends along conduit 712 (and from orifice 718 back to the main container), it is useful for clearing these conduits from small fuel particles which may have fallen into conduit 712 and/or distributed along the conduit extending from orifice 718 back to the main container.

In one example, while the power source is in a standby mode of operation, reaction solution essentially free of fuel particles is circulated through the first flow path and is used to flush the particulate anode in each of the cells for about 10 minutes about every 4 hours. In addition, upon or after the conclusion of a discharge cycle, again when the power source is in a standby mode of operation, reaction solution essentially free of fuel particles is circulated through the second flow path and is used to flush the conduits implementing this and connected flow paths for about 40 seconds.

Figure 8A:
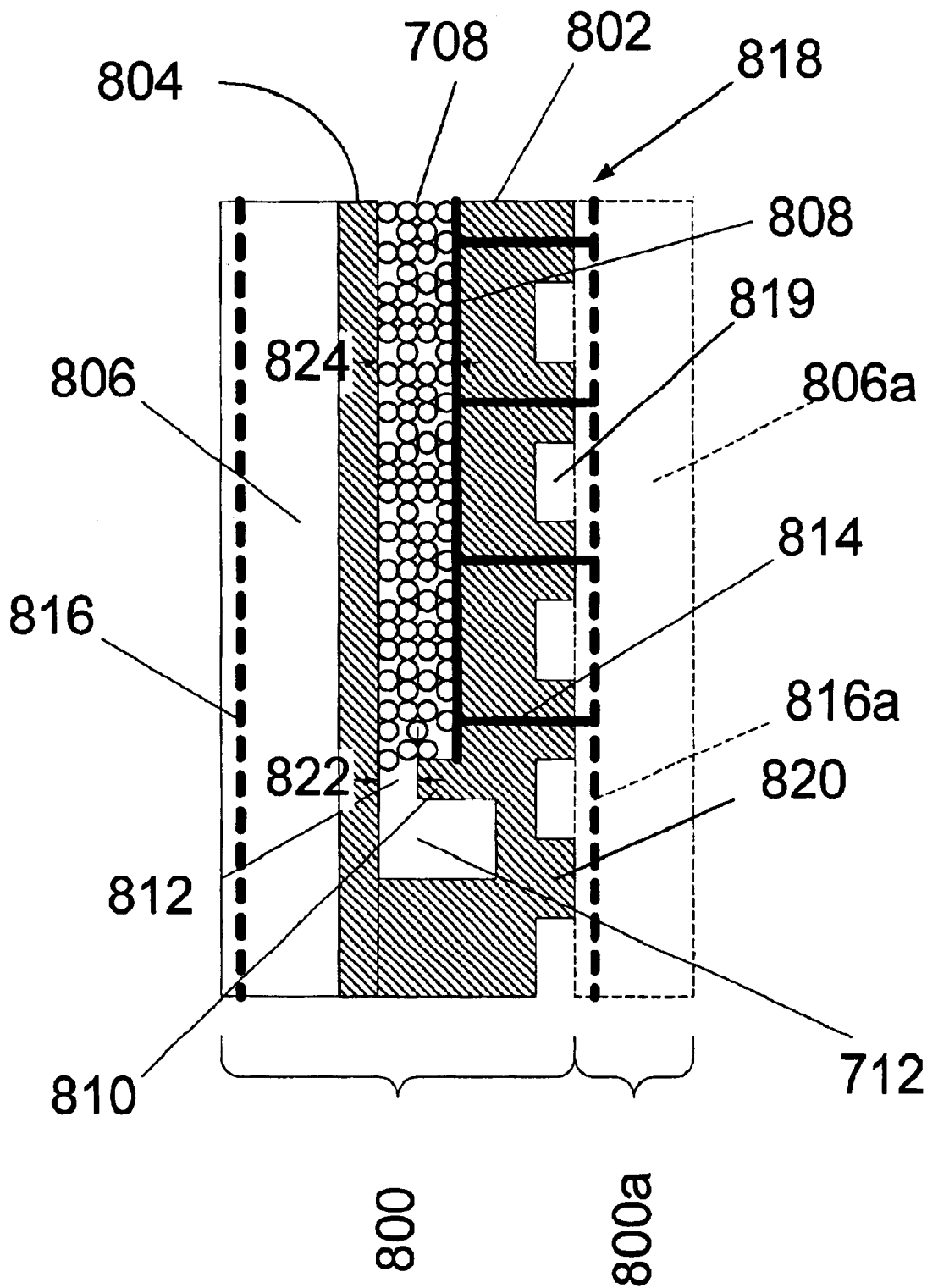
FIG. 8A is a view along 8A—8A in FIG. 7, illustrating a particular embodiment of a particle releaser.

A cross section 800 of one embodiment of cell 700 is illustrated in FIG. 8A. This cross section represents the view 8A—8A in FIG. 7. As shown, the cross-section is formed of a planar laminate arrangement of layers. The particulate anode is identified with numeral 708. To the immediate right of the particulate anode 708 is a metal current collector 808 embedded in a cell frame 802. In one implementation, the cell frame is a plastic cell frame. To the immediate left of the particulate anode 708 is a separator 804, which, in one implementation, is made of a polymer (e.g., polypropylene). To the left of the separator 804 is gas diffusion cathode 806, which, in one implementation, is a carbon and teflon or PTFE gas diffusion electrode. An exemplary embodiment of a polymer composite electrode which can serve as gas diffusion electrode 806 is disclosed in U.S. patent application Ser. No. 10/050,901, entitled "POLYMER COMPOSITES, ELECTRODES, AND SYSTEMS THEREOF," filed Oct. 19, 2001, and owned in common by the assignee hereof. This application is fully incorporated by reference herein as though set forth in full. Embedded in the leftmost portion of cathode 806 is a metal mesh which, in one implementation, is a nickel mesh.

The layers are preferably of a planar form to facilitate stacking of individual cells in series to form a cell stack. In such an arrangement, the rightmost surface of cell body 802 from a cell 800 is placed in contact with the leftmost surface of the cathode 806a from the adjacent cell 800a (shown in phantom in FIG. 8A). In the particular embodiment shown in FIG. 8A, the rightmost surface of cell body 802 is configured to have alternating contact surfaces 820 and voids 819, and it is the contact surfaces 820 which are placed in contact with the cathode 806a. The voids 819 are filled with ambient air to facilitate the passage of oxygen into the interior of the cathode as required by the aforementioned reaction (4) which occurs within the cathodes during the discharge mode.

The current collector 808 is electrically coupled to the metal mesh 816a within the cathode 806a of the adjacent cell 800a through one or more metal pins or rods 814. (The cathode 806a of the adjacent cell is shown in phantom in FIG. 8A.) These pins or rods allow current to pass left to right from one cell to the next, which are stacked on top of one another to form a cell stack.

Alternatively, in lieu of current collector 808 and metal pins or rods 814, the cell body 802 would be made of graphite or a composite of plastic and carbon or plastic and metal particles of sufficient quantity that the plastic composite conducts electricity.

The separator 804 is porous to allow potassium hydroxide reaction solution to pass from the particulate anode 708 to the cathode 806. In addition, the cathode 806 allows the passage of oxygen into its interior to allow the aforementioned reaction (4) to occur during the discharge mode. In FIG. 8A, one entry point of oxygen into cathode 806a is identified with numeral 818. In addition, as discussed, the voids 819 in the rightmost portion of the cell body 802 facilitate the entry of oxygen into the interior of the cathodes.

Referring to FIG. 8A, conduit 712 is in communication through flow channel 812 with the portion of the cell cavity that is occupied by the particulate anode 708. A particle releaser 810 is configured within the cell body 802. When particles are first placed in the portion of the cell cavity, they fall to the bottom of the cell cavity and form bridges across the cavity walls by virtue of the reduction of bed thickness due to particle releaser 810. As anodic dissolution occurs, either through desired electrochemical dissolution or through corrosion, the particles decrease in size, and the bridges collapse. The particle releaser 810 allows these particles to flow through the flow channel 812 and be released from the cell cavity into conduit 712, whereupon they exit the cell through the flow of the reaction solution. Depending on the characteristics of the particle releaser 810, some particles of original size can be also allowed to flow through the flow channel 812 and exit the cell.

Referring to FIG. 1, upon exiting the cell cavity, the reaction solution containing the small particles and the reaction products of the electrochemical reactions which occur during fuel cell operation may be sent to zinc fuel and electrolyte reservoir 108, and then recirculated back into any of the cell cavities within the power source 102. Alternatively, they may be sent to reaction product storage unit 104, and then to regeneration unit 106, where they may be reprocessed into fresh reaction solution, one or more second reactants, and particles of original size. Fresh reaction solution and (optionally) metal particles of original size may then be reintroduced back into any of the cell cavity within the power source 102.

In one implementation, the thickness 824 of the portion of the cell cavity confining the particulate anode is nominally about three times the original diameter of the electroactive (e.g., metal) particles, and the particle releaser 810 is configured such that the width 822 of the flow channel 812 is slightly greater than the original diameter of the electroactive (e.g., metal) particles. For example, for an original particle diameter of 0.6 mm, the thickness 824 of the portion of the cell cavity confining the particulate anode is nominally about 2 mm. The thickness 822 of the flow channel is about 0.85 mm in this example.

Figure 8B:
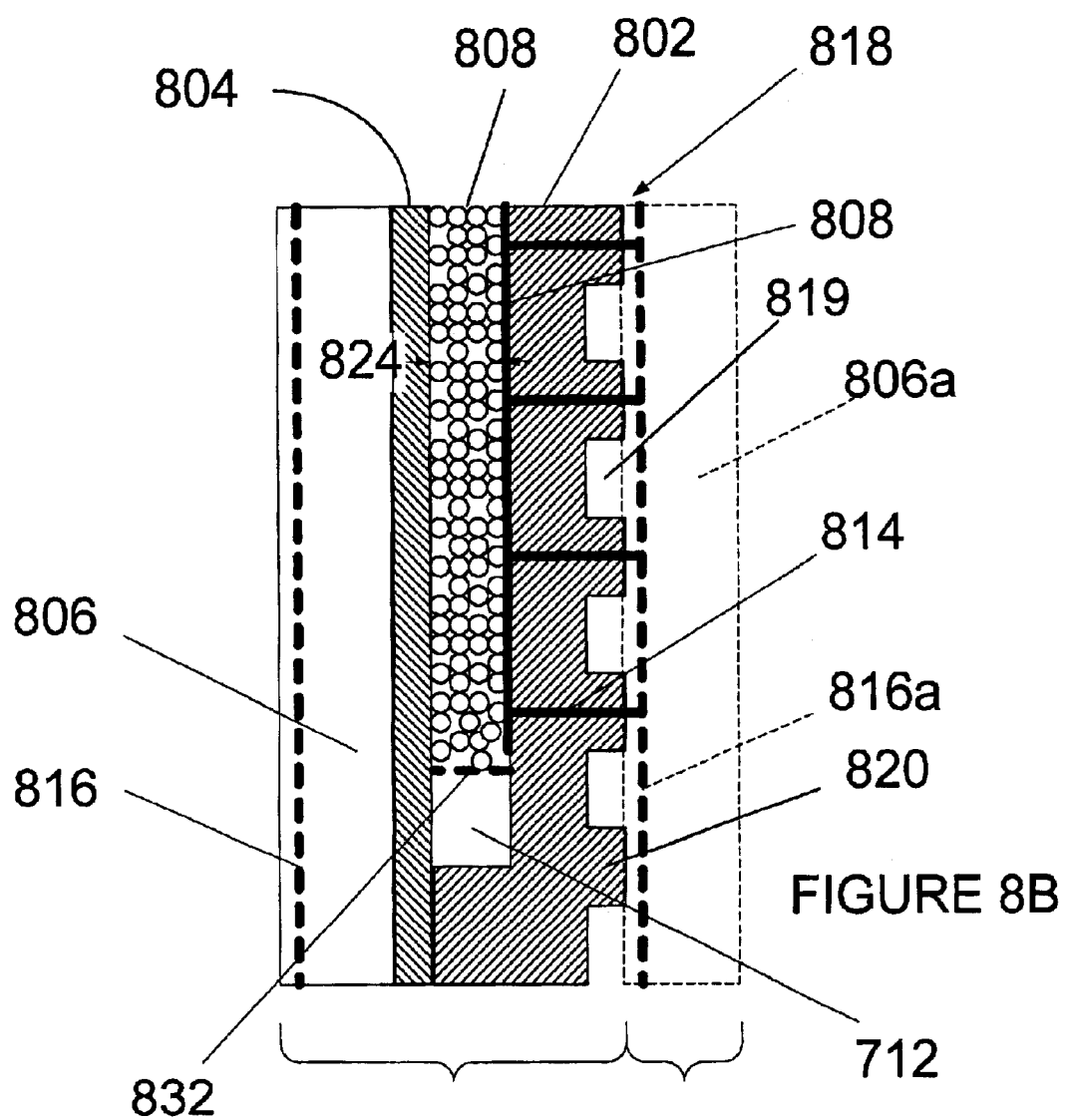
FIG. 8B is a view along 8A—8A in FIG. 7, illustrating a second embodiment of a particle releaser.

A cross section 830 of a second embodiment of cell 700 is illustrated in FIG. 8B. Again, this cross section represents the view 8B—8B of the cell 700 in FIG. 7. As with the previous embodiment, the cross-section is formed of a planar laminate arrangement of layers comprising from left to right cathode 806, separator 804, particulate anode 708, and current collector 808 embedded in a cell frame 802. The individual features of these layers have been previously described and need not be repeated except insofar as to discuss differences with the previous embodiment, which relate to the particle releaser 832 within the cell body 802.

Figure 8C:
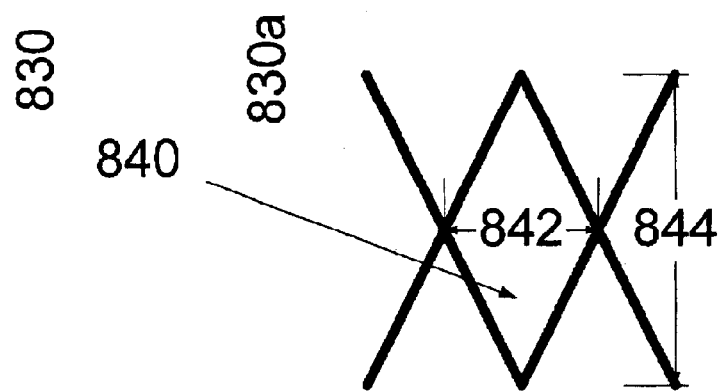
FIG. 8C is a top view of the particle releaser of FIG. 8B.

In this embodiment, particle releaser 832 is formed of a screen, a top view of which is illustrated in FIG. 8C. The screen is in communication with the interior of the cell cavity through the openings 840 in the screen, which form a flow channel with conduit 712. As illustrated in FIG. 8C, each opening 840 has a long axis 844 and a short axis 842. The short axis 842 of the openings 840 in the screen can be approximately equal to the original diameter of the particles, and the long axis can equal or exceed the short axis. In one example, for particles having an original diameter of 0.6 mm, the long axis 844 of each opening 840 is about 1 mm, and the short axis 842 is about 0.6 mm. In this example, the thickness 824 of the cell cavity can be about 2 mm.

The particle releaser in any of the foregoing embodiments can be configured to release a sufficient number of particles so that the interparticle porosity of the anode and the flow rate of reaction solution through the anode are sufficient to facilitate efficient operation of the particle-based electrochemical power source (e.g., fuel cell) and/or to limit accumulation of reaction products within the cell cavity. In one embodiment employing zinc particles and a potassium hydroxide reaction solution, the porosity $\epsilon$ of the particulate anode can be maintained in the range of about 0.4 to about 0.8, where $\epsilon$ is the volume of the cell cavity not occupied by the zinc particles divided by the total volume of the cell cavity (e.g., (1−zinc packing density (as calculated per above)), and the superficial velocity (as calculated per above) of potassium hydroxide reaction solution through the anode should be maintained in the range of about 10 to about 200 cm/min., in order to maintain efficient operation of the zinc-based fuel cell.

A second embodiment of cell 700 is illustrated in FIG. 9. This embodiment is identical to the embodiment illustrated in FIG. 7, except that flow distributor 706 here includes a plurality 722 of fluid mechanical devices for allowing at least a portion of the reaction solution (and optionally particulate material) flowing along flow path 720 to enter the cell cavity, with the remainder exiting the cell cavity through orifice 724. As explained in U.S. Pat. No. 6,296,958, which is hereby fully incorporated herein by reference, the fluid mechanical devices should be configured in such a way that vortices are created in the spaces between adjacent ones of the fluid mechanical devices. These vortices draw reaction solution and optionally particulate material flowing along flow path 722 in a substantially uniform manner.

While various embodiments of the invention have been described, it will be apparent to those of ordinary skill in the art that many more embodiments and implementations are possible that are within the scope of this invention.

What is claimed is:

1. A method of flushing one or more cells or components thereof in a particle-based electrochemical power source comprising:

delivering reaction solution to the one or more cells when the electrochemical power source is in a standby mode of operation;

withdrawing reaction solution from the one or more cells when the electrochemical power source is in a standby mode of operation; and ensuring that the reaction solution delivered to the one or more cells in the standby mode of operation is essentially free of fuel particles by placing a rotatable sleeve valve engaged with a sleeve in a position which blocks particles of fuel from being introduced through one or more holes in the sleeve to the reaction solution delivered to the one or more cells.

2. The method of claim 1 wherein the ensuring step comprises:

moving a movable spout tube for spouting the reaction solution withdrawn from the one or more cells to a position which blocks particles of fuel from being spouted by the spout tube to one or more areas of a container from which reaction solution is pumped to the one or more cells.

3. The method of claim 1 wherein the ensuring step comprises:

maintaining a spout tube in a dormant state.

4. A method of flushing one or more cells or components thereof in a particle-based electrochemical power source comprising:

delivering reaction solution to the one or more cells when the electrochemical power source is in a standby mode of operation; and withdrawing reaction solution from the one or more cells when the electrochemical power source is in a standby mode of operation such that the reaction solution carries small fuel particles prone to clogging from the one or more cells.

5. A method of flushing one or more cells or components thereof in a particle-based electrochemical power source comprising:

delivering, from a container, reaction solution to the one or more cells when the electrochemical power source is in a standby mode of operation; and withdrawing reaction solution from the one or more cells to the container when the electrochemical power source is in a standby mode of operation, whereby the reaction solution carries dissolved reaction product from the one or more cells and the dissolved reaction product is diluted when combined with the reaction solution in the container, such that the reaction solution delivered to the one or more cells has a diluted concentration of dissolved reaction product compared to the reaction solution withdrawn from the one or more cells.

6. A method of flushing one or more cells or components thereof in a particle-based electrochemical power source comprising:

delivering reaction solution bearing fuel particles to the one or more cells when the electrochemical power source is in a standby mode of operation; and withdrawing reaction solution from the one or more cells when the electrochemical power source is in a standby mode of operation.

7. A system for flushing one or more cells or components thereof in a particle-based electrochemical power source comprising:

a delivery and withdrawal subsystem for delivering reaction solution to the one or more cells and withdrawing reaction solution from the one or more cells;

an actuator for actuating the delivery and withdrawal subsystem when the electrochemical power source is in a standby mode of operation; and an ensuring means for ensuring that the reaction solution delivered to the one or more cells during the standby mode of operation is essentially free of fuel particles, the ensuring means comprising:

a rotatable sleeve valve engaging a sleeve having a first position in which particles of fuel are blocked from being introduced through one or more holes in the sleeve to the reaction solution delivered to the one or more cells, and a second position in which particles of fuel situated in one or more areas of a container may be introduced through one or more holes in the sleeve to the reaction solution delivered to the one or more cells; and a second actuator for placing the rotatable sleeve valve in the first position when the electrochemical power system is in the standby mode of operation.

8. The system of claim 7 wherein the ensuring means comprises:

a movable spout tube for spouting the reaction solution withdrawn from the one or more cells, the spout tube having a first position in which particles of fuel are blocked from being spouted by the spout tube to one or more areas of a container from which reaction solution is delivered to the one or more cells, and a second position in which particles of fuel may be spouted by the spout tube to the one or more areas of the container; and a second actuator for placing the spout tube in the first position when the electrochemical power source is in the standby mode of operation.

9. The system of claim 7 wherein the ensuring means comprises:

a spout tube, pump and related conduits which, when actuated, are configured to spout particles of fuel to one or more areas of a container from which reaction solution is delivered to the one or more cells; and a second actuator configured to avoid activating the spout tube, pump and related conduits when the electrochemical power source is in the standby mode of operation.

10. A system for flushing one or more cells or components thereof in a particle-based electrochemical power source comprising:

a delivery and withdrawal subsystem for delivering reaction solution to the one or more cells and withdrawing reaction solution from the one or more cells, wherein the reaction solution from the one or more cells carries small fuel particles prone to clogging from the one or more cells; and an actuator for actuating the delivery and withdrawal subsystem when the electrochemical power source is in a standby mode of operation.

11. A system for flushing one or more cells or components thereof in a particle-based electrochemical power source comprising:

a delivery and withdrawal subsystem for delivering reaction solution to the one or more cells and withdrawing reaction solution from the one or more cells, wherein the reaction solution delivered to the one or more cells is essentially free of fuel particles; and an actuator for actuating the delivery and withdrawal subsystem when the electrochemical power source is in a standby mode of operation.

12. A system for flushing one or more cells or components thereof in a particle-based electrochemical power source comprising:

a delivery and withdrawal subsystem for delivering reaction solution to the one or more cells and withdrawing reaction solution from the one or more cells, wherein the reaction solution delivered to the one or more cells bears fuel particles; and an actuator for actuating the delivery and withdrawal subsystem when the electrochemical power source is in a standby mode of operation.

13. A system for flushing one or more cells or components thereof in a particle-based electrochemical power source comprising:

a delivery and withdrawal subsystem for delivering reaction solution from a container to the one or more cells and withdrawing reaction solution from the one or more cells to the container, wherein the reaction solution from the one or more cells carries dissolved reaction product from the one or more cells, and wherein the dissolved reaction product is diluted when combined in the container, whereby the reaction solution delivered to the one or more cells has a diluted concentration of dissolved reaction product compared to the reaction solution withdrawn from the one or more cells; and an actuator for actuating the delivery and withdrawal subsystem when the electrochemical power source is in a standby mode of operation.

* * * * *